United States Patent [19]
Guillen et al.

[11] Patent Number: 5,701,485
[45] Date of Patent: Dec. 23, 1997

[54] OBJECT ORIENTED DISPATCH AND SUPERCALL PROCESS AND ARRANGEMENT

[75] Inventors: Juan Guillen, Russell; James M. Leask, Canata, both of Canada

[73] Assignee: Sybase, Inc., Emeryville, Calif.

[21] Appl. No.: 786,816

[22] Filed: Jan. 21, 1997

Related U.S. Application Data

[63] Continuation of Ser. No. 479,785, Jun. 7, 1995, Pat. No. 5,600,838, which is a continuation of Ser. No. 184,492, Jan. 18, 1994, abandoned.

[51] Int. Cl.$^6$ .................................................. G06F 9/40
[52] U.S. Cl. .................................................. 395/683
[58] Field of Search .......................................... 395/683

[56] References Cited

U.S. PATENT DOCUMENTS

| | | |
|---|---|---|
| 5,187,786 | 2/1993 | Densmore et al. . |
| 5,265,206 | 11/1993 | Shakelford et al. ............ 395/683 |
| 5,287,447 | 2/1994 | Miller et al. . |
| 5,291,593 | 3/1994 | Abraham et al. . |
| 5,303,379 | 4/1994 | Khoyi et al. . |

OTHER PUBLICATIONS

Sebesta, R., "*Concepts of Programming Languages*," 1989, Chapter 15, pp. 458–483.

Huang, S. et al, "*Two-Way Coloring Approaches for Method Dispatching in Object Oriented Programming Systems*," IEEE, Sep. 1992, pp. 39–44.

Breen, D., "*An Object-Oriented Programming Methodolgy for a Conventional Programming Enviroment*," IEEE, Jul. 1988, pp. 65–72.

*Primary Examiner*—William M. Treat
*Attorney, Agent, or Firm*—John A. Smart

[57] ABSTRACT

Method and arrangement for dispatching messages between instance specific dispatch tables of objects, when a particular object does not have resident the method called for execution in response to a message directed toward it. When a message is sent to a first object and the method called for execution is not resident or associated with the first object, the first object may expressly reference another object of the same class which may contain the required method. The message is according dispatched to another instance specific dispatch table associated with an object which may be able to execute the method called for by the message initially transmitted. Upward chaining between instance, class, and superclass level dispatch tables, and method supercalls canceling the effect of method overriding by instance level methods are included in the method and arrangement.

14 Claims, 4 Drawing Sheets

OBJECT ORIENTED DISPATCH AND SUPERCALL PROCESS AND ARRANGEMENT

CROSS-REFERENCE TO RELATED APPLICATIONS

This application is a continuation application of application Ser. No. 08/479,785, filed Jun. 7, 1995, now U.S. Pat. No. 5,600,838, which is a continuation application of application Ser. No. 08/184,492, filed Jan. 18, 1004, now abandoned.

This application is related to co-pending patent applications each of them filed on Jan. 18, 1994 and having the same inventorship as herein, and respectively entitled "Compilation and Virtual Machine Arrangement and Process for Source Code Including Pre-Runtime Executable Language Constructs," application Ser. No. 08/183,480, "Alternate Dispatch Variable Process and Arrangement for Run-Time Message Redirection and Enablement of Selected Object Oriented Methods," now U.S. Pat. No. 5,522,071 and "Variable Resolution Method and Arrangement," now U.S. Pat. No. 5,632,033. These patents and applications are assigned to the same assignee as herein, and are incorporated herein by reference in their entirety.

BACKGROUND OF THE INVENTION

This invention relates generally to object oriented processes and arrangements, and specifically to dispatch processes and arrangements in object oriented system.

Object systems including object classes and object structures have been organized into processes able to execute on general purpose computers for some time. In such object systems, the objects are associated with selected methods. The methods themselves are executed in the context of the object with which they are installed, pursuant to receipt of a message by the particular object. Accordingly, when an object receives a message invoking a particular resident method, the object will act to execute the method. However, if the particular method called by the message is not resident in the object called or associated with the particular object, the message is, in the general case, not capable of fulfillment.

Fortunately, it is a characteristic of object oriented systems to inherit the characteristics as well as the methods of their associated classes. Accordingly, even though a method may not be present or available for execution directly in the context of a particular object, if its class contains reference to the particular method, the message may nonetheless be fulfilled by reliance upon the class level method. Thus, the method called is executed in reliance upon its presence within the class hierarchy of the called object. This kind of reference arrangement is nonetheless characterized by a range of difficulties in implementation, including operational delays and lack of speed.

Object oriented processes and architectures are additionally known to have employed dispatch tables as a containment structure for methods to be implemented in the context of particular objects with which the dispatch tables are associated. Such dispatch tables containing particular methods association with selected object classes and object superclasses have been well-known.

In accordance with the invention, it is an object to provide an approach for associating selected methods in a dispatch table of a class or superclass with a selected object instance belonging to the class or superclass.

Additionally, it is an object of the invention to provide useful interconnection approaches for developing association schemes between object instances, their classes, and their superclasses to promote efficiency and flexibility in the creation of object relationships and their processing.

It is further an object of the invention to provide a mechanism for exploiting the availability of polymorphisms expressed in multiply expressing the same method in different ways at different levels of an object-oriented system, thereby giving the user run-time flexibility in the particular implementation of a selected method.

SUMMARY OF THE INVENTION

In particular, according to the invention herein, object instances are created which inherit the dispatch tables of their classes and superclasses and additionally annex instance-specific dispatch tables of their own, which include additional methods not present in the inherited dispatch tables and may include methods which supersede the inherited methods from the class or superclass levels. The inherited dispatch tables incorporate the methods of the dispatch tables of the classes and superclasses. Furthermore, the inherited dispatch tables of the object instances refer to the dispatch tables of the classes and superclasses, and they are capable of being modified to override selected methods of the class or superclass and to include new methods specific to the object instance.

Additionally according to the invention, the dispatch tables associated with particular object instances can be associated or linked with each other, so that if a message received by a particular object instance refers to a particular method which is not contained in or associated with the dispatch table of the target object instance, by implementation of a referral process, the dispatch table of the associated object instance is next addressed with the particular message to determine whether the method is available in the linked dispatch table of the other object instance. Further, according to the invention, a dispatch table of an object instance additionally can be directly associated with the dispatch tables of its class and superclasses to enable chained referencing, subject to a specified prioritization scheme, to the dispatch tables of the class and any superclasses.

The referencing scheme according to the invention which interconnects or associates dispatch tables at the instance, class and superclass levels is organized according to a user specified prioritization scheme, according to which an inherited method in the dispatch table of an object instance is implemented rather than the same method in the dispatch table of the class or superclass from which the instance dispatch table is inherited. The object system according to the invention accordingly further permits the accomplishment of asynchronous supercalls to implement higher order methods of the same name as a lower level method which has been specified. Accordingly, a lower level method can include a call to a higher level method, which can in turn include a call to an even higher level method. These calls are implemented by call statements within the code of the respective methods initiating the call. For example, a method call its "super-method" by simply invoking a call statement embedded within the code statements of its own method Further, the method called can similarly exercise a call to the method of its own next-higher-class level. These "so-called" supercalls are effective for reversing the effect of normal implementation of methods at the level which received a message to execute the particular method. Instead of executing at the lowest level consistent with the target of the message, the process of supercalls permits higher-level methods of the same name which had been overridden to again become viable and effective, by effectuation of a simple pre-specified call routine.

Additionally, the invention herein is directed toward instance specific dispatch tables and their associations and prioritization with respect to the dispatch tables of related classes and superclasses. The invention permits instances of a class to adopt methods relating to defined methods of a class or superclass and to modify these defined methods for its own purposes without definition of a new class with its attendant processing overhead and storage requirements. As a result, the number of classes to be managed in a processing architecture is limited and prevented from undue multiplication. By thus restricting the uncontrolled multiplication of new classes to enable instance performance of particularized methods, overall system performance is maintained at an optimal, undegraded level and the speed of runtime is maintained as fast as possible.

Further, great flexibility in the selection of methods to be implemented by object instances under user direction at runtime is achieved by the chaining and interrelationships afforded between dispatch tables at all levels, the instance level, the class, and the superclass. Thus, if a particular method is not currently present in a given object instance, a search routine is capable of implementation by following the preestablished associations between dispatch tables at the instance level and through the class hierarchical structures that have been established.

These and other features and advantages of the present invention will become apparent upon reading the following detailed descriptions and studying the various figures of the drawings.

DETAILED DESCRIPTION OF THE PREFERRED EMBODIMENTS

Figure 1:
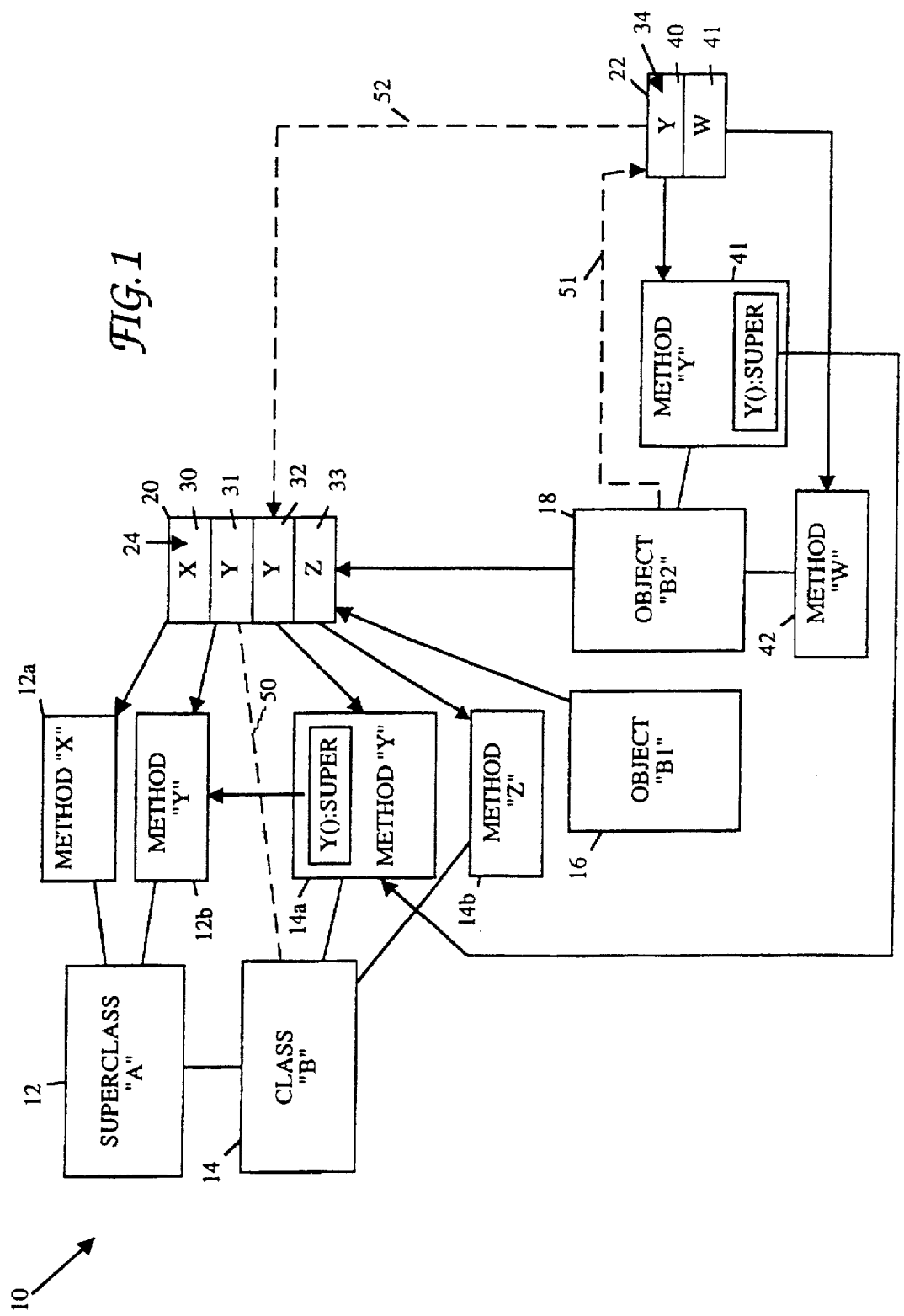
FIG. 1 shows the architecture and relationships between objects, class and superclass, with respect to selected methods referenced by dispatch tables at the class and instance levels which reference methods associated with the respective dispatch tables.

FIG. 1 shows the architecture and relationships between an object class, a superclass, and several object instances which are installed on a general purpose computer for operation in accordance with the invention herein. In particular, FIG. 1 shows an object system 10 including a superclass 12, i.e., "class A;" a class 14, i.e., "class B;" and first and second object instances 16 and 18, respectively object B1 and object B2. Object system 10 of FIG. 1 further includes first and second dispatch tables 20 and 22.

First dispatch table 20 is at the class level and is associated with class B, which is also referenced as class 14. In accordance with the invention, dispatch table 22 is at the instance specific or object level and is associated with the second object instance B2.

Dispatch table 20 references a plurality of methods 24 which as listed as the contents of dispatch table 20, specifically methods X, Y, Y, and Z. These methods 24 are broken out in separate method boxes respectively as methods 30, 31, 32, and 33. Similarly, dispatch table 22 references a plurality of methods 34 which are broken out in separate method boxes respectively as methods 40 and 41. A dotted line 50 from class 14 references dispatch table 20 to emphasize the relationship between the respective object oriented entities. Similarly, a dotted line 51 emphasizes the relationship between instance object 18 and its associated dispatch table 22. As shown in FIG. 1, dispatch table 22 contains reference to first and second methods Y and W. As noted, these methods are expressly treated as separate method boxes 40 and 41.

As can be seen in reference to FIG. 1, method Y appears repeatedly at various levels of object system 10. In particular, method Y is referenced at the superclass level with superclass 12. Class 14 has inherited both methods of its superclass 12.. Accordingly, since superclass 12 has reference to methods X and Y, class 14 has inherited both of these methods X and Y, and class 14 additionally has reference to its own, separately defined method Y which overrides or supersedes the Y method it has inherited from the superclass 12. For this reason, dispatch table 20 makes reference to first and second methods Y having the same name but in actuality not mirroring each other. The separate methods Y may have similarities and may even be substantially the same in content. However, even if one method Y is in many ways substantially a copy of the other method Y, the differences nonetheless make a difference. According to an approach according to the invention herein, the lower level method Y takes precedence and overrides the higher level method Y from the superclass 12. For convenience, the Y method connected to class 14 is labeled method 14a, and the Z method connected to class 14 is labeled method 14b. Similarly, the X. method connected to superclass 12 is labeled method 12a, and the Y method connected to superclass 12 is labeled method 12b.

Method Y in FIG. 1 further is referenced in dispatch table 22 which contains two methods, Y and W. Again, the particular method Y which is referenced at this level, i.e., the instance level, is different than the methods named method Y at the other levels indicated in FIG. 1, i.e., the class and superclass levels. According to an approach under the invention herein, a message sent to object 18 for example which requires the performance of method Y will be implemented with the instance specific method Y which is directly referenced by the lowest level dispatch table 22. However, if the message sent to instance object 18 requires the performance of another method, for example method X, which is referenced in dispatch table 20, this can be accomplished as well, by the fact that dispatch table 22 also explicitly references higher level dispatch table 20 by a specific address reference approach which is well known in the art. In particular, this address reference is suggested by dotted line 52 from dispatch table 22 to dispatch table 20. Thus, when a message calling for performance of method X is sent to object 18, a search is first conducted of associated dispatch table 22 and when method X is not found to be referenced in that dispatch table, by upward chaining, reference is made to dispatch table 20. A search beginning with the lowest level method in dispatch table 20 is then undertaken, with the result that method X is found and executed.

The object system 10 of FIG. 1 further includes provisions for accomplishing asynchronous supercalls to implement higher order methods of the same name as a lower level method which has been specified. Accordingly, a lower level Y method, such as Y method 41, can include a call to a higher level Y method, for example method 14a. Further, method 14a can in turn include a call to an even higher level Y method, that is method 12a. These calls are implemented by call statements within the code of the respective methods initiating the call. For example, method 41 can make a Y-call by executing the statement, "Y(C):super." Further, method 14a can make its own Y-call by executing the same "Y(C):super." These supercalls are effective for reversing the effect of normal implementation of methods at the level which received a message to execute the particular method. Instead of executing at the lowest level consistent with the target of the message, the process of supercalls permits methods which had been overridden to become viable and effective, by simply undertaking the accomplishment of a simple call routine which has been prespecified.

Figure 2:
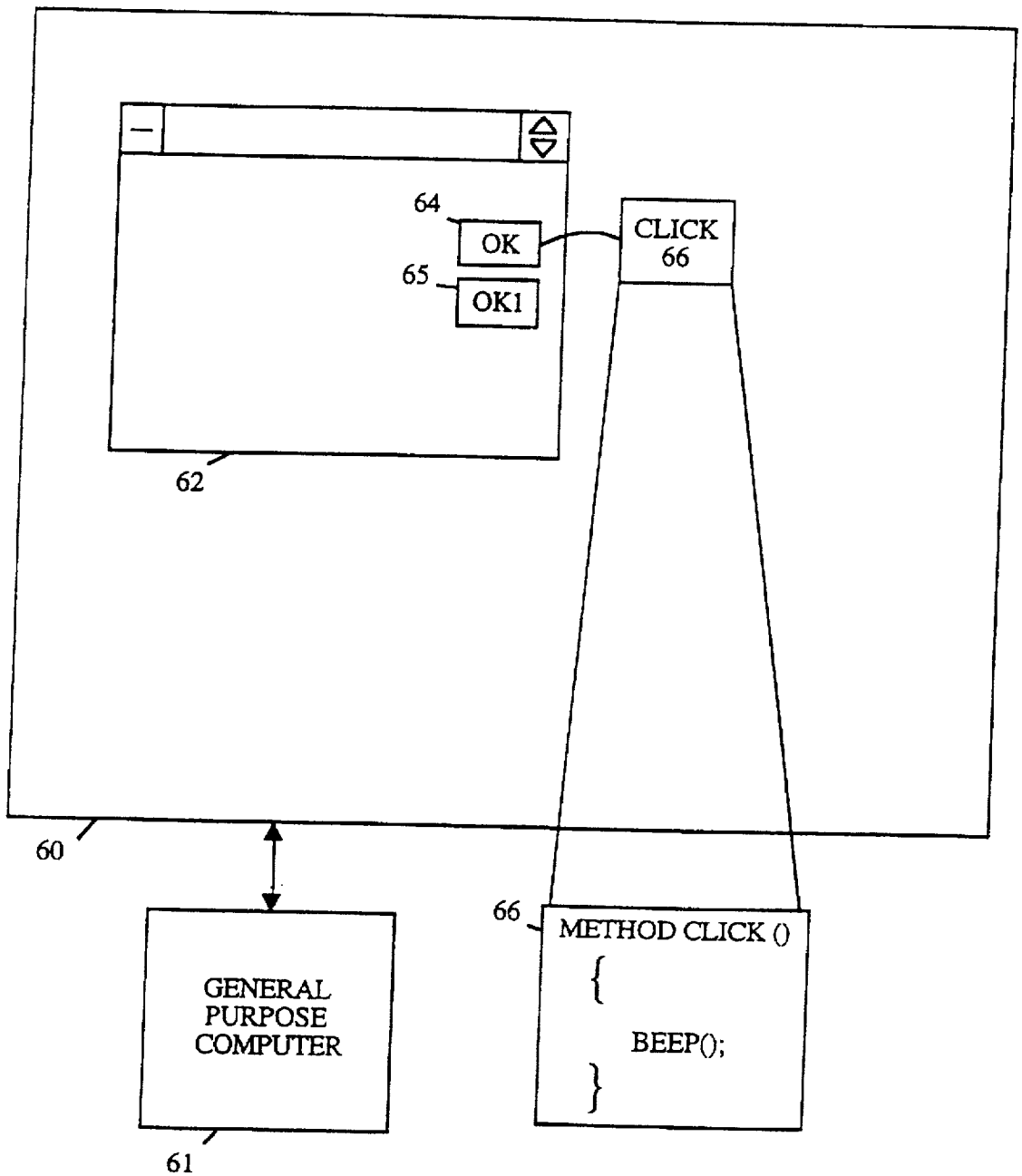
FIG. 2 illustrates a graphical user display (GUI) monitor connected to a general purpose computer and containing a window and a selected click button object which receives messages referencing methods which may be contained in the dispatch table of the selected click button object or in a class level dispatch table.

FIG. 2 illustrates a graphical user display (GUI) monitor 60 connected to a general purpose computer 61 (such as an off-the shelf 80486 Intel microprocessor based personal computer (PC), either stand-alone or network configured). Monitor 60 contains a window 62 and a selected click button object 64 which receives messages referencing methods which may be contained in the dispatch table of the selected click button object 64 or in a class level dispatch table, such as dispatch table 20 shown in FIG. 1. Additionally, FIG. 2 shows a further window representing a method editor window 66. By suitably entering the method editor, the user/programmer can enter specific code to implement a selected method in computer code.

The method set forth in method editor window 66 includes a number of statements, as follows:

```
method click()
{
    beep();
}
```

The above statements in the code of method editor window 66 are effective for defining a method click which is associated with the object button 64. The object button 64 carries a legend "OK" and when a cursor click is exercised on the object within window 60 a "beep" audio sound can be generated. The click method accordingly is accompanied by a "beep." sound upon its execution. If the cursor (not shown) on monitor 60 is then positioned over another object, i.e., object 65' associated with object button 65 which carries the legend "OK1," and which is not directly or specifically associated with the method click, a problem arises. The action of positioning the cursor over the object button 65 and clicking the mouse (not shown) which maneuvers the cursor over object 65 prior to clicking effectively causes a software object-oriented message to be sent to the software object corresponding to the appearance of object button 65. However, no method click is associated with object 65'. As a result, no "beep" sound issues from general purpose computer 61 or from its audio peripherals. However, by several different methods and arrangements according to the invention, a relationship can be expressed between the objects underlying respective object buttons 64 and 65 which will permit object button 65 to rely upon the association between button object 64 (or its class or superclass) and the specific expression of the method click, which if executed will provide an audible "beep" sound.

In the specific case of object buttons 64 and 65 shown in FIG. 2 in the GUI display of window 62 on monitor 60 under operation of general purpose computer 62, both objects 64 and 65 are object instances belonging to the same class, i.e., the class of OK button objects. This class belongs to the superclass of buttons generally. According to the invention, each of the object instances 64 and 65 can be associated with its own dispatch table for containing methods of selection. In the case shown, only one method is referenced, that is the click method. That method accordingly would be expressed in the instance specific dispatch table of the object associated with object instance 64. According to the invention, the dispatch table of object instance 65 can be directly connected with the dispatch table of object instance 64. Accordingly, sending a message (by clicking upon the OK1 button with mouse and cursor) to object button 65—a normally ineffectual act or message, because the click method is not associated directly with object button 65—is nonetheless effective in obtaining successful execution of the method and production of the audible "beep" sound, because the reference at the instance specific level between two object instances (the OK button and the OK1 button) permitted the referral of the click message sent to object button 65 to object button 64.

A related example showing the operation of another version of the invention would be the case of the click method illustrated in FIG. 2 being associated with a higher object level than the instance specific level in which object instances reside. For example, the click method could be defined at the class level, or at the superclass level. Accordingly, but establishing suitable links between the instance level dispatch table and the higher lever dispatch tables of the class and superclass according to the invention herein, it is still possible to exercise the click method by acting upon or message the instance specific object even though the method is not resident at that level.

Another version of the invention involves differently defining the click method at the instance level, the class level, and at the superclass level. In other words, this would permit obtaining different execution results depending upon whether the message were sent to an object not having the click method defined, but relying upon the variation of the click method defined at the class level, or whether the message were sent to an object not having the click method defined at either the instance or class level, but relying upon the variation of the click method defined at the superclass level, or whether the message were simply sent to the object in fact directly having the method defined in its immediately associated dispatch table. In the classical prior art sense the most immediate, or lowest level method definition would have an overriding effect. According to the prior art, instance level dispatch tables are not known, even though the objects themselves could express knowledge of specific methods. However, even taken classically, the higher order method expressions are evokable simply by absence of lower level expression of the same methods. Thus, in the absence of lower level method expressions to override the higher level expression, the high level method evocation can be evoked.

Still, in accordance with the supercall approach according to the invention, even in the presence of superseding or overriding method expression at lower levels, the user, by inserting supercall statements prior to or at runtime can cancel out the overriding effects which are not desired. Accordingly, considerable operational efficiency is gained by immediately being able to access a range of overridden methods in accordance with the techniques of supercalling, as will be discussed in greater detail below.

Figure 3:
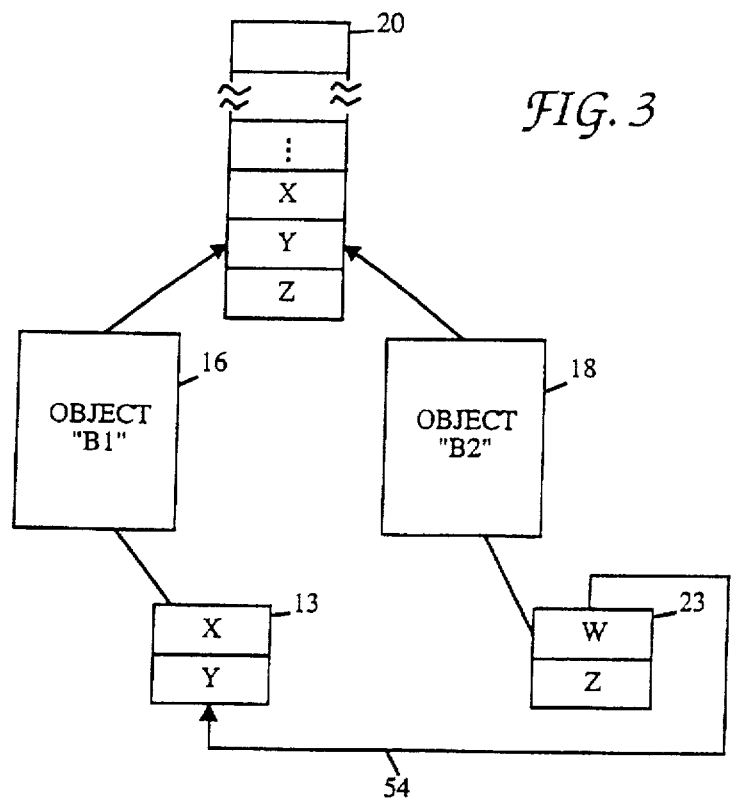
FIG. 3 illustrates first and second object instances referencing a class level dispatch table and each referencing an immediately associated dispatch table of its own.

FIG. 3 illustrates first and second object instances, respectively 16 and 18, referencing a class level dispatch table 20 and each referencing an immediately associated dispatch table their own, respectively 13 and 23. By suitable address referencing, dispatch table 23 containing methods W and Z is effective for referencing the dispatch table 13 of another object instance 16. Accordingly, when object instance 18 receives a message requiring performance of method Y, after an initial search bottom to top of dispatch table 23 associated with object instance 18, the search is completed, and a search of instance level referenced dispatch table 13 is undertaken. Accordingly, instance specific dispatch tables and instance specific referencing at the instance level are enabled and implementable.

Figure 4:
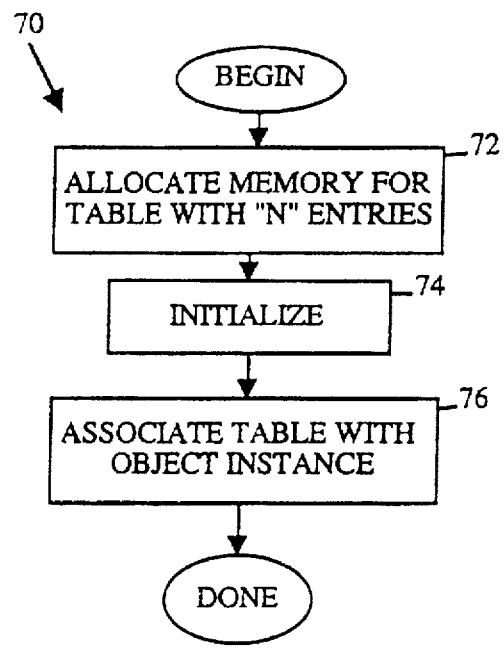
FIG. 4 is a flow chart of a method for creating an instance specific dispatch table.

FIG. 4 is a flow chart of a method 70 for creating an instance specific dispatch table, such as for example instance specific dispatch table 23 in FIG. 3. First, as suggested at block 72, the instance specific dispatch table is created by allocating a sufficient amount of memory in computer to enable storage of a table with N entries. Second, as suggested at block 74, the instance specific dispatch table location is initialized. If no entries are made into the table after initialization, table 23 is empty or blank. Finally, as indicated at block 76, the table 23 is associated with its object instance. The association is accomplished preferably by placing the address of the referenced new instance specific dispatch table in the new object's instance specific dispatch table pointer.

Figure 5:
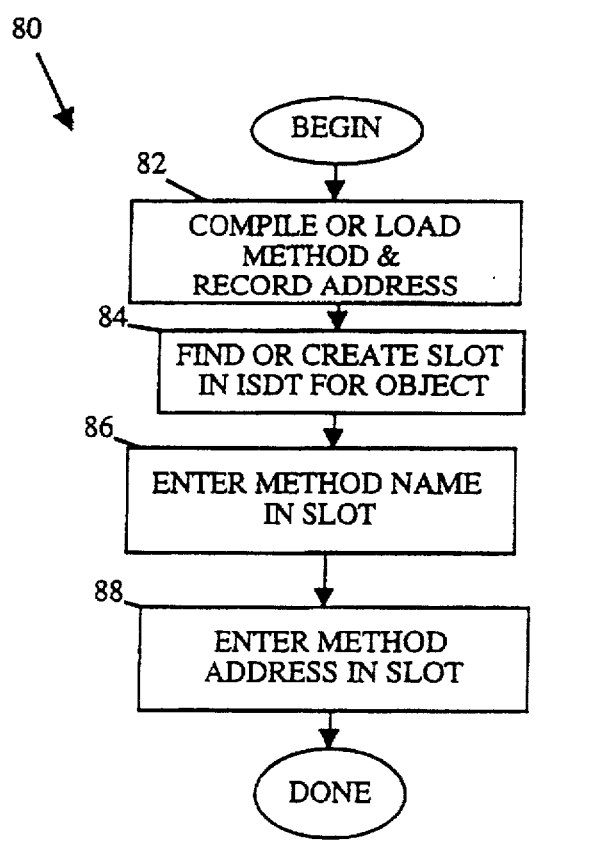
FIG. 5 is a flow chart of a method for creating an instance specific dispatch table entry.

FIG. 5 is a flow chart of a method 80 for creating an instance specific dispatch table entry. As noted with respect to FIG. 4, at the time of creation of the instance specific dispatch table 23, no values or methods will have been entered into any of its slots or positions. In order to create an entry for the instance specific dispatch table 23, the following method steps are undertaken. First, a selected method is compiled or loaded into the instance specific dispatch table at a selected location thereof, as suggested at block 82. Next, as also suggested at block 82, the address of the selected location of the instance specific dispatch table is remembered or noted at a suitable memory location. Then, according to block 84, a suitable slot is found or created in the instance specific dispatch table for the desired object and the method which is to be referenced at a particular location of the dispatch table 23. Next, according to block 86, the name of the method to be applied is entered in the particular slot which has been selected. Finally, according to block 88, the address of the desired method is placed in the slot.

Figure 6:
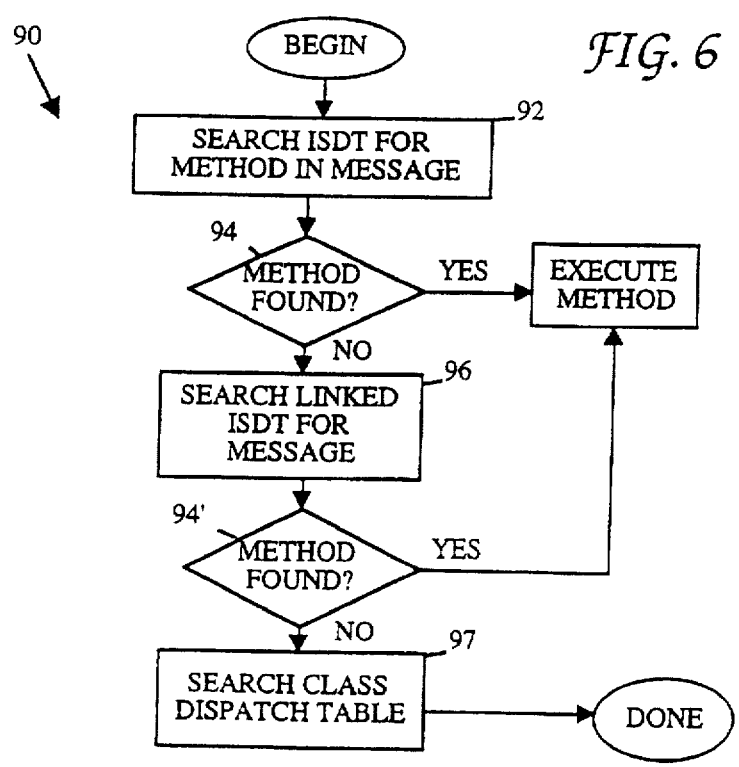
FIG. 6 is a flow chart of a method according to which an object instance responds to a message in a way effective for employing its associated dispatch table.

FIG. 6 is a flow chart of a method 90 according to which an object instance 23 responds to a message in a way effective for employing its associated dispatch table 18, for example. The message response occurs according to method 90. According to a first step, as indicated at block 92, a search is conducted as to the instance specific dispatch table for the message with the searched name, beginning with the bottom-most entry in the dispatch table 18. If the sought-after method is found, according to block 94, the associated method is executed. If, according to block 96, the method desired is not fund in the initial instance specific dispatch table 23, then a search is initiated with respect to a linked other instance specific dispatch table, such as for example, instance specific dispatch table 13 in FIG. 3 which is linked to initially searched instance specific dispatch table 23, and the search is initiated as to instance specific dispatch table 13 in accordance with, in sequence, blocks 92 and 94 as already discussed above. Next, according to block 96, if no desired method is found in any linked instance specific dispatch table, then a search is conducted as to the dispatch table 20 persisting at the class level, i.e., as to a class dispatch table or "CDV." If, at that point, the method of interest has been found, the steps of execution according to claim 94 are conducted.

In summary, the object oriented dispatch and supercall process and arrangement according to the invention can be carried out in many ways. Message dispatching is accomplished by linking dispatch tables residing at the object instance level. Message dispatching is accomplished between to instance specific, the class, and the superclass levels. Additionally, supercalls can be invoked to take advantage of variations in method definition at the instance, the class, and the superclass levels, without having to create additional objects which rely directly upon an unoverridden method definition. These available approaches to messaging and method handling in object oriented systems permit the user with newfound flexibility in operation and the ability to alter performance prior to and at runtime.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. In a system for creating and using an object-oriented program created from object-oriented source listings in a computer, the source listings comprising a plurality of objects created as specific instances of object-oriented classes, each object-oriented class having class methods which are shared among objects instantiated from the object-oriented class, the program operating in response to messages received by objects, a process for invoking a method specific to a particular object instance of an object-oriented class, the process comprising:

creating instances of first and second objects, said first and second objects both being created from a particular object-oriented class, said first and second objects both having access to class methods which are shared among all objects instantiated from said particular object-oriented class;

creating an instance specific method for a select one of said first and second objects;

upon receipt by said first object of a message calling a particular method, determining whether the particular method called is an instance specific method of said first object or a class method for both said first and second objects;

if the particular method called is determined to be an instance specific method of said first object or a class method for both said first and second objects, executing the method at said first object;

upon receipt by said second object of a message calling a particular method, determining whether the particular method called is an instance specific method of said second object or a class method for both said first and second objects;

if the particular method called is determined to be an instance specific method of said second object or a class method for both said first and second objects, executing the method at said second object; and wherein each instance specific method is invoked upon receipt of a given message by a particular object instance associated with that method but not by other object instances of the class.

2. The method of claim 1, wherein said creating an instance specific method includes:

creating an instance specific dispatch table which associates the instance specific method with a particular object instance.

3. The method of claim 2, further comprising:

creating a class dispatch table which associates class methods with all object instances instantiated from the class.

4. The method of claim 3, wherein said class dispatch table stores pointers allowing all object instances instantiated from the class to invoke class methods for the class.

5. The method of claim 2, wherein each object instance does not have, by default, access to the instance specific dispatch table and instance specific methods of another object instance of the class.

6. The method of claim 5, wherein each object instance can be provided access to the instance specific dispatch table and instance specific methods of another object instance of the class, upon a request from a user to link the two object instances together.

7. The method of claim 6, wherein at least one object instance is provided access to the instance specific dispatch table and instance specific methods of another object by using an alternate dispatch variable for linking said at least one object instance to the instance specific dispatch table of said other object.

8. The method of claim 7, wherein receipt of a message at one object instance is processed by:

attempting first to invoke a method at said one object instance for handling the message; and if a method is not successfully invoked for handling the message at said one object instance, employing said alternate dispatch variable to invoke a method at said other object for handling the message.

9. The method of claim 1, wherein each of said first and second objects is associated with its own particular instance specific dispatch table, so that each object of the same class has access to at least one method which the other object of the same class does not.

10. The method of claim 1, further comprising:

displaying representations of said first and second objects on a graphical user interface; and receiving, during runtime execution of said program, user input for establishing a connection from said second object to first second object, so that messages for invoking methods of said first object can be received initially by said second object and then dispatched to said first object for execution.

11. The method of claim 10, further comprising:

in response to receiving said user input, storing in an alternate dispatch variable of said second object information describing the connection.

12. The method of claim 11, further comprising:

upon receipt by said second object of a message calling a particular method, determining whether the particular method called is a method of said second object;

if the particular method called is determined to be a method of said second object, executing the method at said second object;

if the particular method called is determined not to be a method of the second object, dispatching said message from said second object to said first object, based on said information stored by said alternate dispatch variable of said second object which describes the connection from said second object to said first object; and if the particular method called is determined to be a method of said first object, executing the method at said first object.

13. The method of claim 1, wherein said creating an instance specific method includes:

creating a method, associated a particular object instance, which overrides a corresponding class method defined for the class from which said particular object instance had been created.

14. The method of claim 13, wherein other object instances of the class continue to employ at runtime the class method defined for the class.

* * * * *